April 25, 1950  E. S. MacPHERSON  2,505,128
VALVE STEM OIL SEAL
Filed Feb. 19, 1945
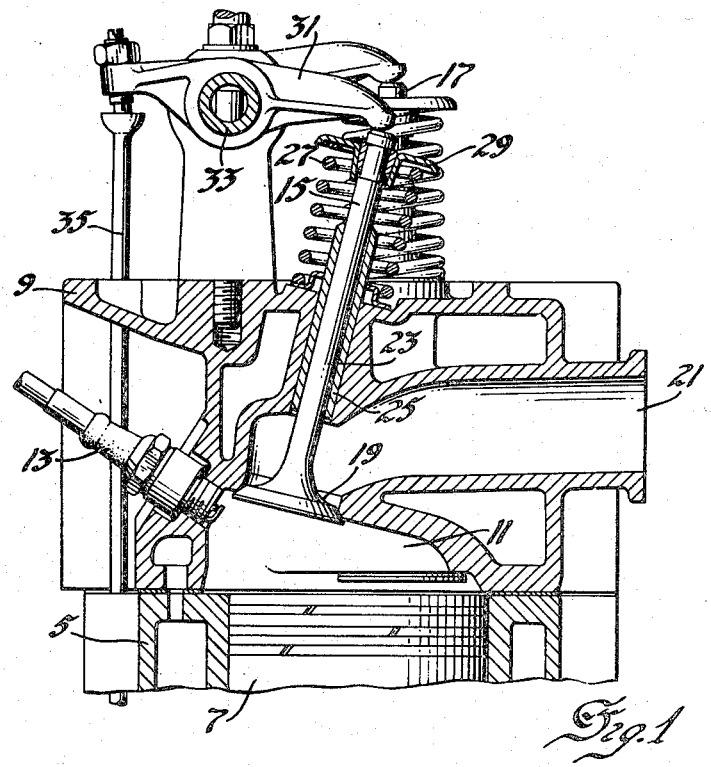
Fig. 1
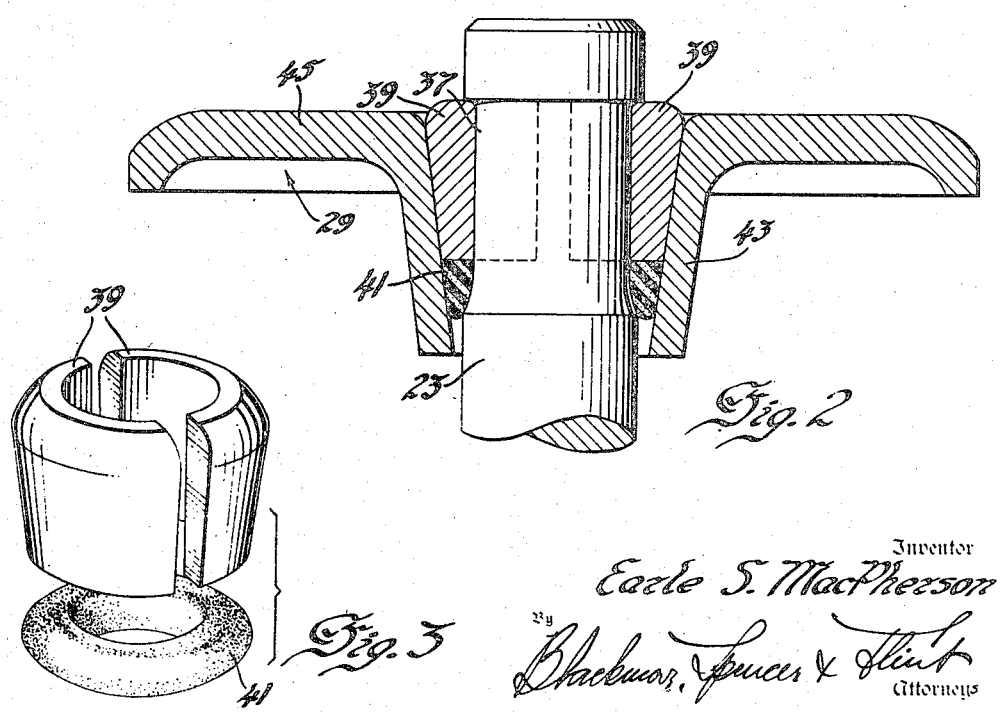
Fig. 2
Fig. 3
Inventor
Earle S. MacPherson
By Blackmore, Spencer & Flint
Attorneys Patented Apr. 25, 1950

2,505,128

UNITED STATES PATENT OFFICE 2,505,128

VALVE STEM OIL SEAL

Earle S. MacPherson, Detroit, Mich., assignor to General Motors Corporation, Detroit, Mich., a corporation of Delaware Application February 19, 1945, Serial No. 578,778

4 Claims. (Cl. 251—144)

A problem has arisen in connection with the lubrication of the rocker arms for operating the valves of engines. Some of the oil supplied for the rocker arm bearing reaches the end of the valve and flows down the stem through the guide and thus reaches the entrance to the combustion chamber.

To avoid this flow of oil down the valve stem and through the valve guide resort has been had to a sort of umbrella covering the top of the valve stem. While this has been productive of good results, the inertia of such an added metal plate interferes, to some extent, with the operation of the valve.

The present invention has for its object the same prevention of a flow of oil down the valve stem and it proposes to accomplish its object without materially augmenting the inertia effects. Other objects such as simplicity in construction, efficiency in operation and low cost will be understood from the description which follows.

In the accompanying drawing:

Fig. 1 is a view in section through the upper end of an engine and its head with the novel oil seal shown on the valve stem.

Fig. 2 is a sectional view of the oil seal on a larger scale.

Fig. 3 is a view in perspective of two parts in disassembled relation.

Referring by reference characters to the drawing, the cylinder is marked 5 and its piston 7. The head 9 forms, together with the cylinder, a combustion chamber 11 within which the explosion occurs when the charge therein is fired by the spark plug 13.

Valves 15 and 17 control the inlet of the explosive mixture and the discharge of burned gases as usual. They have heads as seen at 19 to open and close the passages such as 21 leading to the chamber 11. The valve stems 23 slide through guides 25 as usual. A spring 27 is seated on a surface of the cylinder head and presses against an abutment 29 carried by the end of the stem thus serving as the means to close the valve. A rocker arm 31 for each valve is rotatably supported at 33 in the usual way. One end is pushed by a push rod 35 actuated by the engine camshaft, not shown, and the other end pushes against the valve stem. It intermittently serves to overcome the pressure of the spring and open the valve.

With this arrangement of valve operation, oil must be supplied for the rocker arm bearing and some of this oil reaches the valve stem and flows down within the guide with harmful results. The provision for preventing this flow of oil is best seen in Figures 2 and 3. The valve stem has a circumferential groove indicated by numeral 37. A split key marked 39 is placed within this groove. Its halves have flared peripheries which, when assembled, form a cone having its greater diameter adjacent the end of the stem. The groove is of such axial length that beneath the key there may be fitted into the lower end of the groove a ring of synthetic rubber 41 or other deformable material. This rubber when assembled may be substantially circular in cross section. The spring abutment 29 is in the form of a tapered sleeve 43 having its larger diameter uppermost, and a flange 45 which is hollowed out to receive the end of the spring 27. As the spring moves the abutment plate upwardly the cooperating inclined faces of its sleeve and of the key limit the upward movement, the key being pressed into the groove of the stem as it determines the operative position of the abutment.

It will be seen from the drawing that the inner diameter of the lower end of sleeve 43 is less than the outer diameter of the seal 41. As the abutment reaches its operative position it therefore deforms the seal somewhat as shown by Fig. 2. In consequence, any oil around the end of the stem is sealed from flowing down the stem and through the guide. The expedient accomplishes its purpose without adding materially to the weight and consequently to the inertia effects which were present in installations where metal plates were used to shed the oil.

I claim:

1. A valve having a stem, a circumferential recess adjacent the top of the stem having a non-tapered portion and another portion, a split ring key seated in the non-tapered portion of said groove and having a tapered external surface, a spring abutment with a tapered bore engaging the tapered external surface of said key to secure the abutment to the stem, a deformable incompressible ring of greater cross-section than said recess seated in the other portion of said recess and also in contact with the bottom surface of said key and said tapered bore, said tapered bore at the lower edge of said ring being of substantially larger diameter than said stem and being open below said ring to provide a space between the spring abutment and the stem to accommodate axial deformation of said ring when it is compressed between the stem and the tapered bore of the spring abutment for sealing so that the abutment will seat properly on the key.

2. A valve having a stem as defined in claim 1 in which said other portion of said recess is a smooth curve so that the ring will not be cut when deformed.

3. A valve having a stem, stop means on said stem, interengaging means on said stem and stop means to position said stop means on the stem, a spring abutment having a central aperture, interengaging means on said stop means and spring abutment for securing the abutment and stem together in substantially concentric relation, the apertured portion of said spring abutment extending beyond said stop means and surrounding said stem in spaced relation to provide an annular space which is opened at one side with the stem constituting the inner wall and the spring abutment the outer wall, said space including an annular recess in one of said walls, a resilient deformable substantially incompressible rubberlike ring positioned in the portion of said annular space including said recess and contacting the other wall, said ring being deformed by said walls to have a diametral thickness the same as the distance between said other wall and the base of said recess and to increase its depth in said annular space, and said open side providing an outlet for the flow of the excess of the deformed ring.

4. A valve having a stem, stop means on said stem, said stop means having a face around said stem, a spring abutment having a central tapered aperture, said spring abutment and said stop means engaging each other to secure the abutment to the stem, a deformable incompressible ring surrounding said stem and occupying an annular space of less radial thickness than said ring and bounded internally by the stem, externally by the tapered aperture and at one side by said face, the minimum diameter of said tapered aperture being larger than the diameter of said stem at the other side of the ring whereby said space extends beyond said ring to provide space between the spring abutment and the stem to accommodate axial deformation of the ring when it is compressed between the stem and tapered aperture of the spring abutment for sealing so that the abutment will seat properly on the stop means.

5. A valve having a stem, stop means on said stem, said stop means having a face around said stem, a spring abutment having a central aperture, said spring abutment and said stop means having interengaging means to substantially concentrically secure the abutment to the stem, a deformable incompressible ring surrounding said stem and occupying a portion of an annular space of less radial thickness than said ring, bounded internally by the stem, externally by the aperture, and at one side by said stop means, the diameter of said aperture at the other side of the ring being larger than the diameter of said stem at said other side of the ring whereby said space is open beyond said ring to provide space around said stem to accommodate axial deformation of the ring when it is compressed between the stem and aperture of the spring abutment for sealing so that the abutment will seat properly on the stop means.

EARLE S. MacPHERSON.

REFERENCES CITED

The following references are of record in the file of this patent:

UNITED STATES PATENTS

| Number | Name | Date |
| --- | --- | --- |
| 940,143 | Foltz | Nov. 16, 1909 |
| 1,344,347 | Lee | June 22, 1920 |
| 1,370,346 | Nelson | Mar. 1, 1921 |
| 1,420,898 | Willey | June 27, 1922 |
| 1,482,774 | Wills | Feb. 4, 1924 |
| 1,711,267 | Hutt | Apr. 30, 1929 |
| 2,330,091 | Townhill | Sept. 21, 1943 |